(12) United States Patent
Flint et al.

(10) Patent No.: US 6,735,700 B1
(45) Date of Patent: May 11, 2004

(54) FAST VIRUS SCANNING USING SESSION STAMPING

(75) Inventors: Barney Flint, Aylesbury (GB); Michael Hughes, San Francisco, CA (US)

(73) Assignee: Network Associates Technology, Inc., Santa Clara, CA (US)

( * ) Notice: Subject to any disclaimer, the term of this patent is extended or adjusted under 35 U.S.C. 154(b) by 0 days.

(21) Appl. No.: 09/481,060

(22) Filed: Jan. 11, 2000

(51) Int. Cl.[7] .................................................. G06F 1/24
(52) U.S. Cl. ...................... 713/200; 713/188; 713/189; 713/193; 713/201
(58) Field of Search ................................ 713/188, 189, 713/193, 200, 201

(56) References Cited

U.S. PATENT DOCUMENTS

| | | | | |
|---|---|---|---|---|
| 5,473,769 A | | 12/1995 | Cozza | 395/183.15 |
| 5,502,815 A | | 3/1996 | Cozza | 395/183.14 |
| 5,649,095 A | | 7/1997 | Cozza | 395/183.15 |
| 5,956,481 A | * | 9/1999 | Walsh et al. | 713/200 |

* cited by examiner

Primary Examiner—Thomas R. Peeso
(74) Attorney, Agent, or Firm—Blakely, Sokoloff, Taylor & Zafman LLP; Christopher J. Hamaty, Esq.

(57) ABSTRACT

A unique session key is created for each execution of anti-virus software and is used to create a session stamp for each file scanned during that execution. The session stamp is stored in the directory entry for the file. When a request for the file is made, the anti-virus software uses the current session key to validate the session stamp. An invalid or absent session stamp indicates that the file needs to be scanned.

38 Claims, 8 Drawing Sheets

FAST VIRUS SCANNING USING SESSION STAMPING

RELATED APPLICATION

This present application is related to application Ser. No. 09/481,053, filed Jan. 11, 2000, titled "Fast Virus Scanning (attorney docket number 003631.P007), assigned to the same assignee as the present application and filed on the same day.

FIELD OF THE INVENTION

This invention relates generally to computer virus detection, and more particularly to virus scanning.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright ® 1997, Network Associates, Inc., All Rights Reserved.

BACKGROUND OF THE INVENTION

Anti-virus (AV) programs are, by design, fairly intrusive applications. They must sit between a user—or the user's applications—and the computer's file system, to ensure that infected files are not written to the file system. If infected files already reside on the file system, the AV program must ensure that they are not executed or copied to other computers.

AV programs scan computer files for known viruses in a number of ways, such as by comparing each file to a list of "virus signatures" that are stored in "virus signature files" or by emulating computer instructions contained within the file to evaluate the effect of the instructions. The scanning can be done upon request of a user, when the file is accessed on a mass storage device such as by an application, or on a scheduled basis. Virus scanning is, therefore, a resource intensive (CPU and disk I/O) and time-consuming task, especially in the case of access scanning. Oftentimes, a user's file-open request must be delayed until the file can be scanned and possibly cleaned. This resource consumption can lead to a degradation of a computer's overall performance and slower response times for users.

Various techniques are currently used to reduce the amount of time and computer resources required by AV scanning. The techniques share the concept of saving a set of parameters, an AV "state," for the file as of the last scan so that once a file has been scanned and found free of infection, it should not need to be scanned again unless the file is modified. The parameters chosen for the AV state are indicative of virus infection if changed, such as the file's length, checksum, and date of last file write operation.

One common technique is to create an in memory cache containing the AV state for files that have been scanned during the current execution of the AV program. The cache can be checked whenever a file is accessed or when a scheduled scan is due. If the file's AV state is in the cache, the AV state parameters for the file in the scan information cache are checked against the current parameters of the file. If the parameters match, a virus scan is not necessary. If the parameters do not match, or if the AV state for the file is not cached, then the file is scanned. The drawback to this approach is that such caches are limited to a reasonable memory size and cannot efficiently track all the files (potentially millions) that may reside on a file server, or even the smaller number that reside on individual stand-alone personal computers. Because the cache is volatile, the AV state for only the most recently used files will be present in the cache. The volatility of the cache also means that the cache is lost when the current execution of the AV program is terminated and thus must be recreated when the AV program is restarted, causing delays for the users as the requested files are re-scanned and the cache re-populated.

Another approach stores the AV state (often just a checksum) in an external database that is then compared against the current values of the AV state parameters when the file is accessed. This technique is only effective if the AV state information is thoroughly secure against unauthorized changes. The user or administrator also faces the challenges inherent in maintaining the external database. Additionally, the database technique requires that the AV state is accessed separately from the file itself, thus incurring system overhead. The total processing cost of generating the AV state, storing it in the external database and retrieving it when needed can exceed the cost of scanning the file.

An alternate technique that is similar to the external database approach addresses the cost of accessing the AV state separately from the file itself by appending the AV state (again frequently just a checksum) to the end of the file. However, this scheme is less secure than the others in that a sophisticated virus can overwrite the checksum with the value for the infected file. Additionally, since the AV program modifies the file, errors in the program may cause loss of user data. Moreover, the addition of information to a file can cause various system utilities to assume the file is bad, causing the original version of the file to be reloaded, or it may be viewed as virus-like behavior, triggering a false alarm. This technique is also disfavored by users and systems administrators who are reluctant to give a third-party the right to modify their files.

Therefore, the current techniques used by AV programs provide only limited savings of user time and system resources when scanning files, while often introducing other risks and complications as a result.

SUMMARY OF THE INVENTION

The above-mentioned shortcomings, disadvantages and problems are addressed by the present invention, which will be understood by reading and studying the following specification.

Anti-virus software creates a session key for each execution of the software. It obtains a session stamp that is associated with a directory entry for a file that is to be scanned. If the session stamp was created using a session key for a previous session, or if there is no session stamp, the file is scanned for viruses. An existing session stamp is updated as a result of the scan. In one aspect, the existing session stamp is updated by being invalidated if the file is infected. In another aspect, the existing session stamp is updated by identifying the file as infected.

The current session key is used when updating a session stamp or when a new session stamp is created. In one aspect, the session stamp contains a signature that is alternately a session key or known value encrypted with a session key.

Because the session stamp is associated with the file's directory entry, the file system automatically reads the session stamp into memory, if the entry is not already cached, thus reducing the number of file accesses necessary to determine the AV state of the file. Because directory entries are stored so they can be rapidly accessed, associating the session stamp with the entry also decreases the overall time a user must wait for the file to become available. Additionally, when the file is renamed or moved without changes to the file itself, the session stamp remains with the directory entry so that the file does not have to be rescanned.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is, to be understood that other embodiments may be utilized and that logical, mechanical, electrical and other changes may be made without departing from the scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of the invention is presented. In the third section, methods for an embodiment of the invention are provided. In the fourth section, data structures and application program interfaces for a particular implementation of the invention are described. Finally, in the fifth section, a conclusion of the detailed description is provided.

Operating Environment

Figure 1:
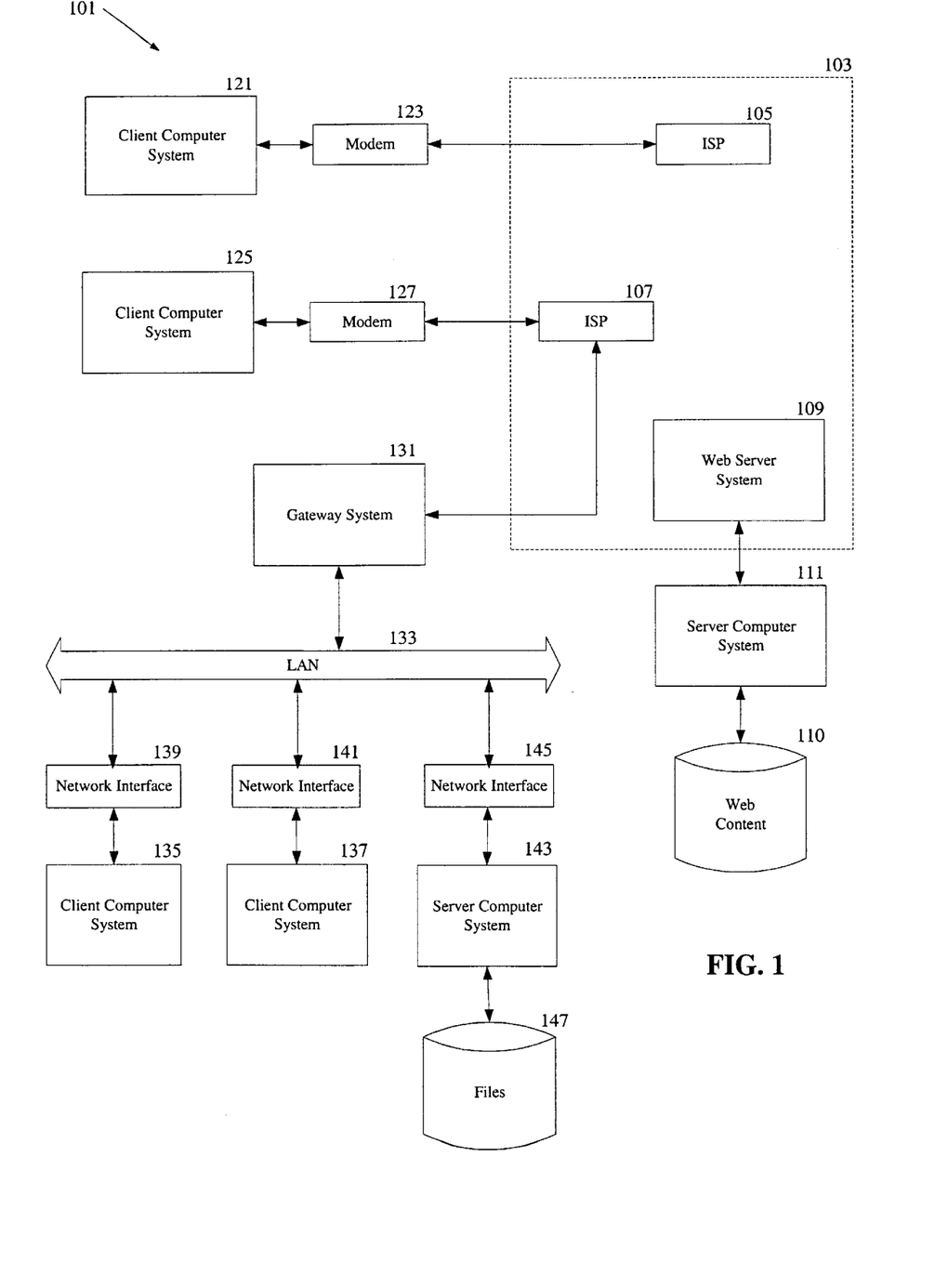
FIG. 1 is a diagram of one embodiment of an operating environment suitable for practicing the present invention.
Figure 2:
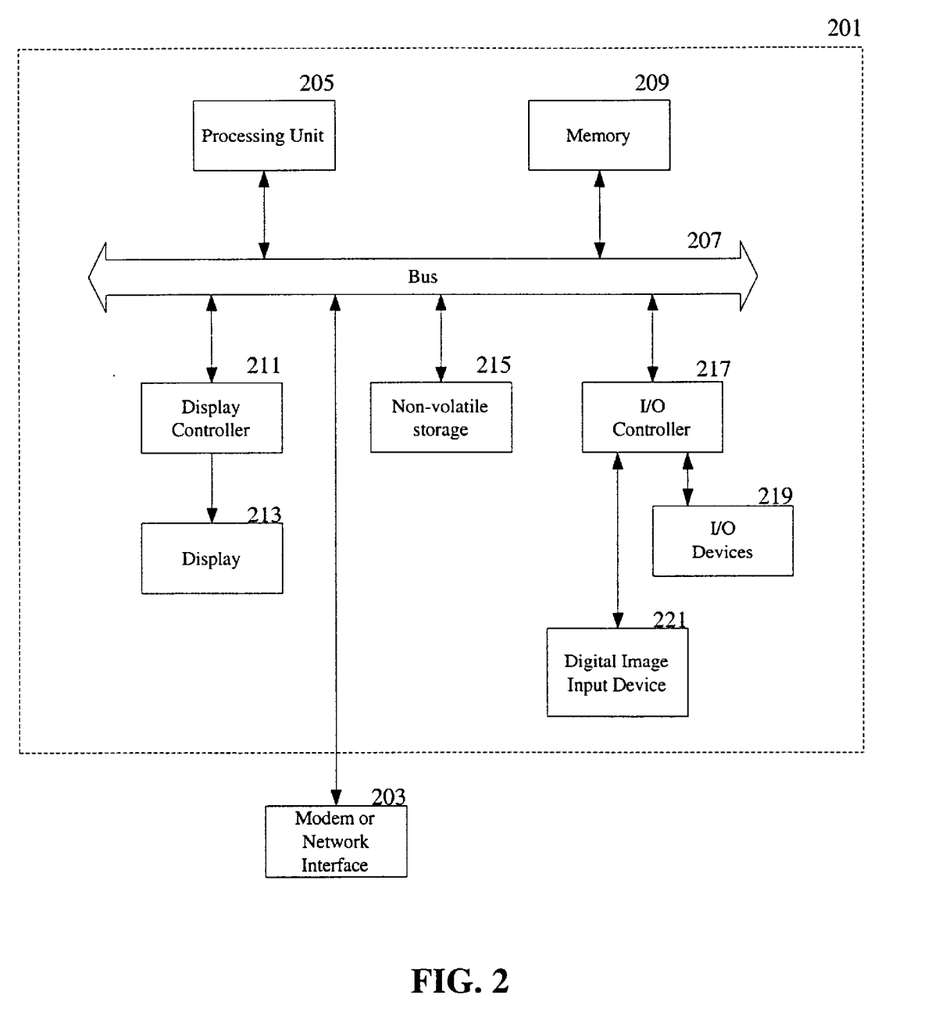
FIG. 2 is a diagram of one embodiment of a computer system suitable for use in the operating environment of FIG. 1.

The following description of FIGS. 1 and 2 are intended to provide an overview of computer hardware and other operating components suitable for implementing the invention, but is not intended to limit the applicable environments. One of skill in the art will immediately appreciate that the invention can be practiced with other computer system configurations, including hand-held devices, multi-processor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 1 shows several computer systems 101 that are coupled together through a network 103, such as a local-area network (LAN) or the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 103 is typically provided by Internet service providers (ISP), such as the ISPs 105 and 107. Users on client systems, such as client computer systems 121, 125, 135, and 137 obtain access to the Internet through the Internet service providers, such as ISPs 105 and 107. Access to the Internet allows users of the client computer systems to exchange information, receive and send e-mails, and view documents, such as documents which have been prepared in the HTML, format. These documents are often provided by web servers, such as web server 109 which is considered to be "on" the Internet. Often these web servers are provided by the ISPs, such as ISP 105, although a computer system can be set up and connected to the Internet without that system being also an ISP, as is well known in the art.

The web server 109 is typically at least one computer system which operates as a server computer system and is configured to operate with the protocols of the World Wide Web and is coupled to the Internet. Optionally, the web server 109 can be part of an ISP which provides access to the Internet for client systems. The web server 109 is shown coupled to a server computer system 111 which itself is coupled to web content 110, which can be considered a form of a media database. It will be appreciated that while two computer systems 109 and 111 are shown in FIG. 1, the web server system 109 and the server computer system 111 can be one computer system having different software components providing the web server functionality and the server functionality provided by the server computer system 111.

Client computer systems 121, 125, 135, and 137 can each, with the appropriate web browsing software, view HTML pages provided by the web server 109. The ISP 105 provides Internet connectivity to the client computer system 121 through the modem interface 123 which can be considered part of the client computer system 121. The client computer system can be a personal computer or other similar computer system. Similarly, the ISP 107 provides Internet connectivity for client systems 125, 135, and 137, although as shown in FIG. 1, the connections are not the same for these three computer systems. Client computer system 125 is coupled through a modem interface 127 while client computer systems 135 and 137 are part of a LAN. While FIG. 1 shows the interfaces 123 and 127 generically as modems, it will be appreciated that each of these interfaces can be an analog modem, ISDN modem, cable modem, satellite transmission interface, or other interfaces for coupling a computer system to other computer systems. Client computer systems 135 and 137 are coupled to a LAN bus 133 through network interfaces 139 and 141, which can be Ethernet network or other network interfaces. The LAN bus 133 is also coupled to a gateway computer system 131 which can provide firewall and other Internet related services for the local area network. This gateway computer system 131 is coupled to the ISP 107 to provide Internet connectivity to the client computer systems 135 and 137. The gateway computer system 131 can be a conventional server computer system. Also, the web server system 109 can be a conventional server computer system.

Alternatively, as well-known, a server computer system 143 can be directly coupled to the LAN bus 133 through a network interface 145 to provide files 147 and other services to the clients 135, 137, without the need to connect to the Internet through the gateway system 131.

FIG. 2 shows one example of a conventional computer system that can be used as a client computer system or a LAN server computer system or as a web server system. It will also be appreciated that such a computer system can be used to perform many of the functions of an Internet service provider, such as ISP 105. The computer system 201 interfaces to external systems through the modem or network interface 203. It will be appreciated that the modem or network interface 203 can be considered to be part of the computer system 201. This interface 203 can be an analog modem, ISDN modem, cable modem, token ring interface, satellite transmission interface (e.g. "Direct PC"), or other interfaces for coupling a computer system to other computer systems. The computer system 201 includes a processor 205, which can be a conventional microprocessor such as an Intel Pentium microprocessor or Motorola Power PC microprocessor. Memory 209 is coupled to the processor 205 by a bus 207. Memory 209 can be dynamic random access memory (DRAM) and can also include static RAM (SRAM). The bus 207 couples the processor 205 to the memory 209 and also to non-volatile storage 215 and to display controller 211 and to the input/output (I/O) controller 217. The display controller 211 controls in the conventional manner a display on a display device 213 which can be a cathode ray tube (CRT) or liquid crystal display. The input/output devices 219 can include a keyboard, disk drives, printers, a scanner, and other input and output devices, including a mouse or other pointing device. The display controller 211 and the I/O controller 217 can be implemented with conventional well known technology. A digital image input device 221 can be a digital camera which is coupled to an I/O controller 217 in order to allow images from the digital camera to be input into the computer system 201. The nonvolatile storage 215 is often a magnetic hard disk, an optical disk, or another form of storage for large amounts of data. Some of this data is often written, by a direct memory access process, into memory 209 during execution of software in the computer system 201. One of skill in the art will immediately recognize that the term "computer-readable medium" includes any type of storage device that is accessible by the processor 205.

It will be appreciated that the computer system 201 is one example of many possible computer systems which have different architectures. For example, personal computers often have multiple buses, one of which can be considered to be a peripheral bus. A typical computer system will usually include at least a processor, memory, and a bus coupling the memory to the processor.

It will also be appreciated that the computer system 201 is controlled by operating system software which includes a file management system, such as a disk operating system, which is part of the operating system software. One example of an operating system software with its associated file management system software is the Windows family of operating systems from Microsoft Corporation of Redmond, Wash., including the workstation and server versions. The file management system is typically stored in the non-volatile storage 215 and causes the processor 205 to execute the various acts required by the operating system to input and output data and to store data in memory, including storing files on the non-volatile storage 215.

System Level Overview

Figure 3:
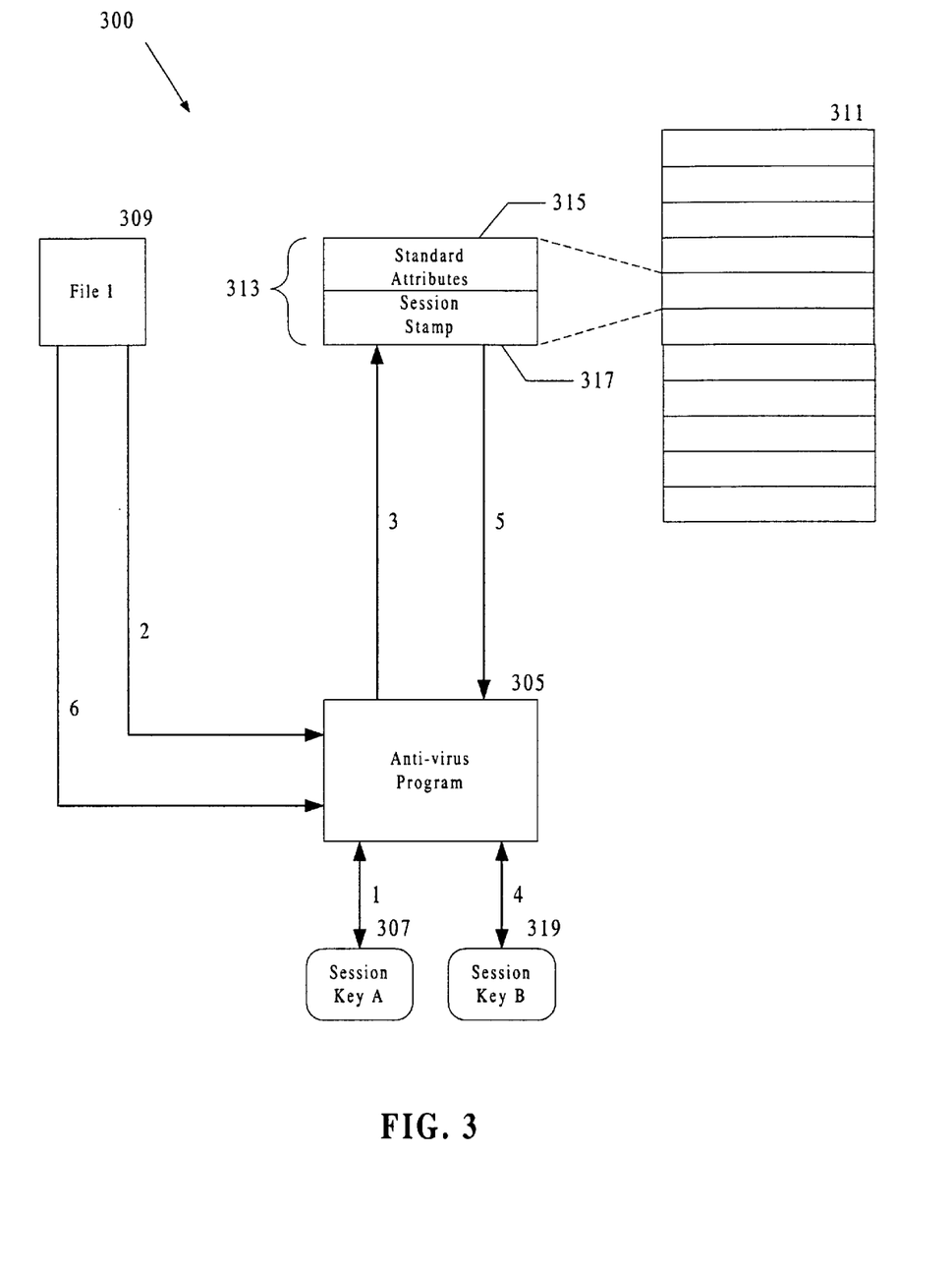
FIG. 3 is a diagram illustrating a system-level overview of an embodiment of antivirus software incorporating the invention.

A system level overview of the operation of an embodiment of the invention as incorporated into an anti-virus software program is described by reference to FIG. 3 in which actions taken by the anti-virus software are illustrated by numbered arrows. The anti-virus software program 305 executes on a computer, such as a server computer system 143 or 111 in FIG. 1, or a individual client computer, such as client 121, 125, 135, 137. A file system, executing as part of the operating system as described previously in conjunction with FIG. 2, maintains a directory 311 of files stored on non-volatile storage, such as storage 215 in FIG. 2. Each entry 313 in the directory 311 contains standard attributes 315 that describe the file and its location on the non-volatile storage as is common in the art. A file system suitable for use as file system 301 also provides space in the directory entry 313 for application-defined extended attributes. One such extended attribute is a session stamp 317, which is created by the program 305 when a file is scanned.

When the anti-virus program 305 is first executed, or when it is restarted after having been stopped, it must determine if any files are infected with computer viruses. This determination can be accomplished by scanning each file as it is accessed or by scanning all files using a low-priority, background task, referred to herein as a "pre-population" scan. In the embodiment illustrated in FIG. 3, the anti-virus program 305 creates 1 a unique identifier, session key A 307, anytime it is initialized. As each file, such as file1 309, becomes eligible for scanning, either due to user-requested access or a part of a pre-population scan, the program 305 examines the session stamp 317 in the directory entry 313 corresponding to the file1 309. If the session stamp 317 does not exist (null), the anti-virus program 305 scans 2 the file, and creates 3 the session stamp 317 if the file is not infected. Thus, the presence of a valid session stamp 317 alone can identify the AV state of the file, i.e. free of viruses.

The session stamp 317 contains a "signature." In one embodiment, the session key A 307 is used to encrypt a known value and the encrypted value is stored 3 as the signature. In an alternate embodiment, the session key 307 itself is stored 3 as the signature. Context information that characterizes the AV state in more detail can also be stored with the signature, either encrypted or unencrypted. Because both files that are infected and files that have not been scanned do not have a session stamp 317 as described above, the program 305 will rescan infected files as well as unscanned files. In a further embodiment, a session stamp 317 is also created when a file is found to be infected and the session stamp 317 contains information that indicates the file is infected. Storing session stamps for infected files enables the program 305 to distinguish between infected files and unscanned files, thus saving the time and resources incurred by unnecessarily re-scanning infected files. Additional optional context information, such as scanning sensitivity settings, that can be stored as part of the session stamp is described in detail further below.

If the session stamp 317 does exists, its validity is checked using the current session key as described next.

Assume now, that after the anti-virus program 305 has created the session key 317 for the file1 309 based on the session key A 307, it has been stopped and is now being re-started. When the program 305 is re-initialized, it creates another unique identifier for the current session key, session key B 319. When file1 309 again becomes eligible for scanning, the program 305 retrieves 5 the session stamp 317 from the directory entry 313 for the file1 309. The program 305 then uses the session key B 319 to determine if the file1 309 needs to be rescanned.

If the session key A 307 was stored as the session stamp 317 for the file1 309, the program 305 compares the session stamp 317 with the session key B 319. Because they do not match, the session stamp is invalid and program 305 must rescan 6 the file1 309.

If the signature in session stamp 317 is an encrypted value, the program 305 uses the session key B 319 to decrypt the signature. Because a known value was encrypted with the session key A 307 to create the signature, the decryption produces a result that is different from the known value, and the file1 309 will be rescanned 6 because the session stamp is invalid.

Rescanning the file1 309 causes a new session stamp 317 to be created based on the session key B 319, and stored in the directory entry 313.

As is conventional with anti-virus software, the program 305 monitors all relevant file system accesses. If file1 309 is modified, either legitimately or maliciously, the anti-virus program 305 invalidates the session stamp 317 in the corresponding directory entry 313. In one embodiment, the session stamp 317 is invalidated by deleting it from the entry 313.

Because the session stamp is checked using the current session key, a session stamp that has been tampered with by a virus program cannot be validated since it will either not match or fail to decrypt properly. As an additional safeguard, in an alternate embodiment the program 305 monitors the file system routines that modify the extended attributes to detect if a session stamp is altered and deletes it if so.

Because all session stamps created by one execution of the anti-virus program 305 are invalidated when that execution of the program terminates, an option is provided in an alternate embodiment that allows the user to only stop the scanning facility of program 305. In this embodiment, the program 305 continues to monitor all relevant file system accesses. Thus, the current session key continues to be valid and only those files that are modified while the scanning is disabled have their session stamps invalidated. Thus, only new and modified files will be rescanned when the scanning facility is re-enabled.

Because the session stamp is stored as an extended attribute of the file, it is mostly available in the disk cache when the file is being accessed or, if not already cached, it will be automatically read as part of the file access by the file system. In either case, the act of obtaining the session stamp from the directory entry is faster than obtaining an AV state that is stored a separate file. Additionally, when the file is renamed or moved without changes to the file itself, the extended attributes go with the file so that it does not have to be rescanned.

The system level overview of the operation of an embodiment of the invention has been described in this section of the detailed description. An anti-virus program has been described that minimizes the time and system resources used to unnecessarily scan files by saving a session stamp as part of the extended directory attributes for the file. Because the directory entry is accessed whenever the file is accessed, no additional overhead is associated with retrieving the session stamp to determine the AV state of the file. Additionally, because the session stamp indicates the AV state of the file while the anti-virus scanning is enabled, there is no need to re-scan the file until it is changed or the scanning is stopped. While the invention is not limited to any particular operating environment that provides for extended attributes, for sake of clarity a simplified file system and the interactions of the anti-virus software with it have been described.

Methods of Embodiments of the Invention

In the previous section, a system level overview of the operations of embodiments of the invention was described. In this section, the particular methods of the invention are described in terms of computer software with reference to a series of flowcharts. The methods to be performed by a computer constitute computer programs made up of computer-executable instructions. Describing the methods by reference to a flowchart enables one skilled in the art to develop such programs including such instructions to carry out the methods on suitably configured computers (the processor of the computer executing the instructions from computer-readable media). If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application . . . ), as taking an action or causing a result. Such expressions are merely a shorthand way of saying that execution of the software by a computer causes the processor of the computer to perform an action or a produce a result.

Figure 4:
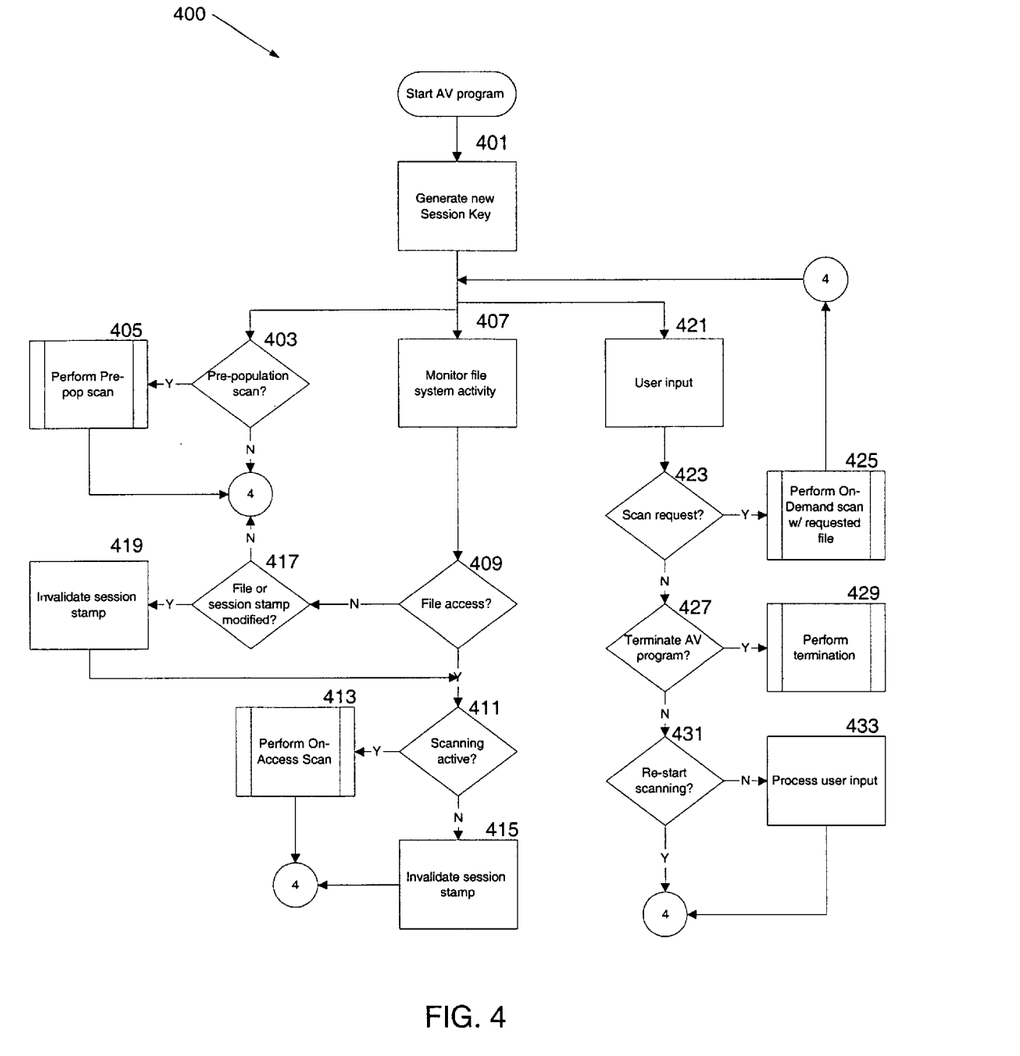
FIG. 4 is a flowchart of a method to be performed by a computer executing one embodiment of the anti-virus software shown in FIG. 3.

Referring first to FIG. 4, the acts to be performed by a computer executing an anti-virus method 400 that incorporates one embodiment of the invention are shown. FIGS. 5–8 illustrate certain processes performed by the method 400 in more detail.

When the anti-virus method 400 is executed, it generates a current session key (block 401). Three main activities that operate in parallel are initiated. If a pre-population scan has been requested (block 403), it is started as a background task (block 405). The processing represented by block 405 is described in more detail below with reference to FIG. 5.

The anti-virus method 400 begins monitoring activity in the file system (block 407) as is conventional with anti-virus programs. If a file is accessed (block 409) and the anti-virus scanning facility of the method 400 is active, the method 400 performs an on-access scan process described below with reference to FIG. 7. If the scanning facility has been stopped, the session stamp of the file is invalidated (block 415).

Figure 8:
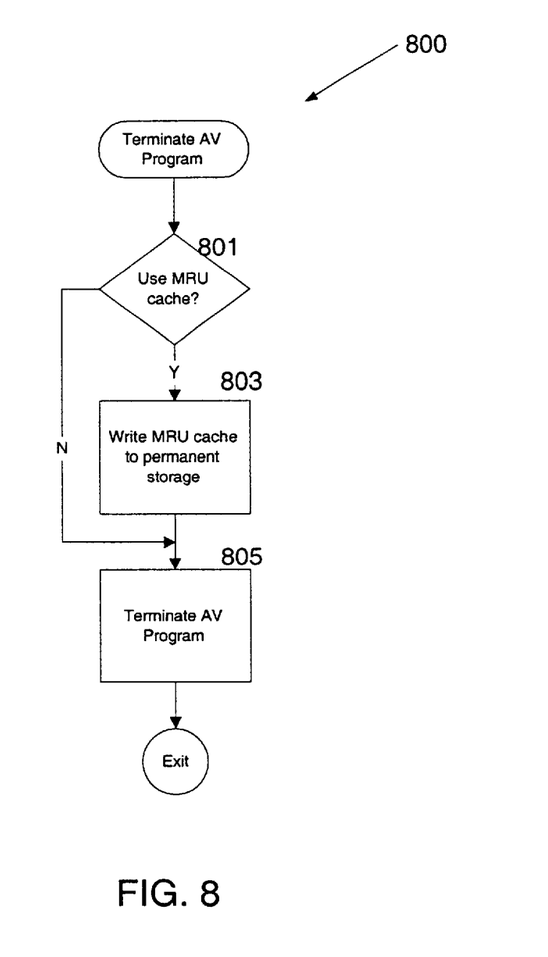
FIG. 8 is a flowchart of method performed by a computer when terminating the method shown in FIG. 4.

The third activity waits for user input (block 421). When user input is received, it is evaluated to determine if the user has requested that a particular file be scanned (block 423). If so, an on-demand scan is performed using the requested file as the scan set as described below with reference to FIG. 6. If the user input specifies the termination of the anti-virus program (block 427), a termination process illustrated by block 429 and described in more detail below in conjunction with FIG. 8 is performed. When the user has previously requested the scanning facility be stopped (as described next), the user can request it be restarted (block 431). Any other user input, including a request to stop the scanning facility, is processed at block 433. Such user input also includes changing preference parameters that control the overall functioning of the anti-virus software. The user can also specify which files to include in a pre-defined scan set that is used by the on-demand scan of FIG. 6. The handling of such user input is well understood in the art and is not discussed further. Moreover, it will be appreciated that the input interface is conventional and thus not illustrated.

In an alternate embodiment, not illustrated, when a file is accessed while the anti-virus scanning facility is inactive (block 411), the file can also be added to a rescan list in addition to having its session stamp invalidated at block 415. When the user requests that the scanning be resumed (block 431), the rescan list is used as the file set for the on-demand scan method illustrated in FIG. 6.

Figure 5:
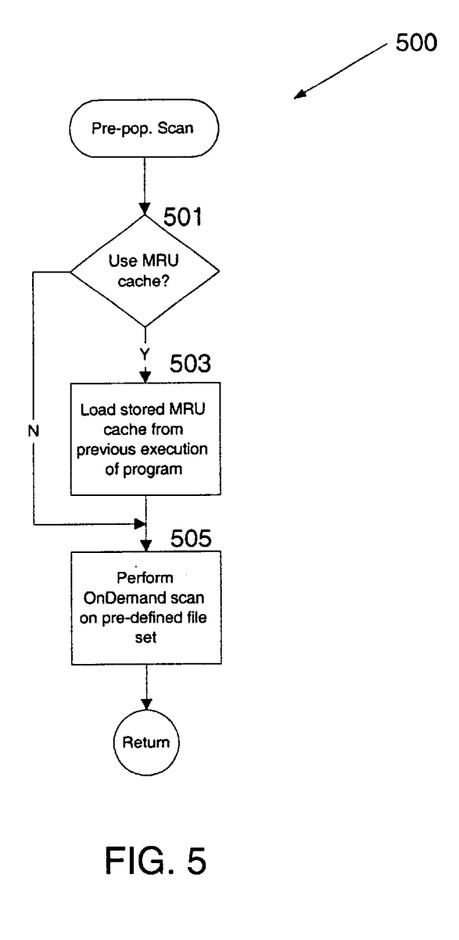
FIG. 5 is a flowchart of a pre-population scan method performed by a computer executing the method shown in FIG. 4.

Turning now to the acts illustrated in FIGS. 5 and 8, when an execution of the method 400 is terminated (FIG. 8), if the user has configured the anti-virus software to save the "most recently used" (MRU) files for use by the pre-population scan method (block 801), the cache is saved to non-volatile storage at block 803. The current execution of the method is terminated at block 805.

FIG. 5 illustrates the acts performed by a computer when executing the pre-population scan upon initializing a new execution of the method 400. If the anti-virus-software was configured to save the MRU cache upon termination of the previous execution of the method (block 501), the MRU cache is loaded at block 503 and used as the file set for the on-demand scan method 600 illustrated in FIG. 6 and described next. Otherwise, a pre-defined set created from the user's input as described above is passed to the on-demand scan method 600. All other files are rescanned when accessed as described previously in conjunction with FIG. 4. Thus, the MRU cache significantly minimizes the amount of scanning necessary when the anti-virus method 400 is restarted without requiring a large number of expensive on-access scans since the probability is high that the files most likely to be used will be scanned by the pre-population scan of FIG. 5 before they are accessed.

Figure 6:
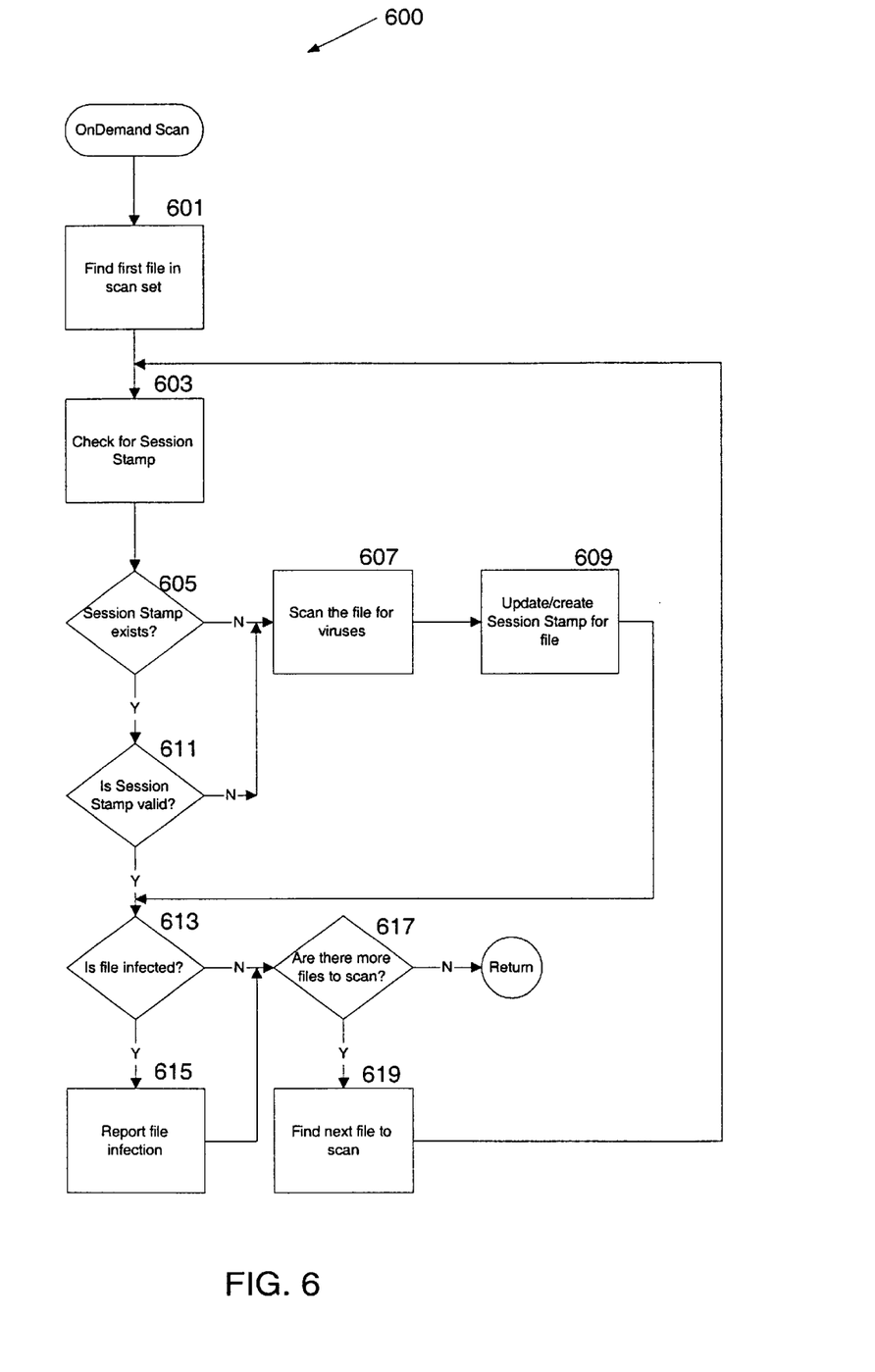
FIG. 6 is a flowchart of an on demand scan method performed by a computer executing the method shown in FIG. 4.

The on-demand scan method illustrated in FIG. 6 is invoked by the method of FIGS. 4 and 5 to scan a pre-determined set of the files on the computer (scan set) as a background task. It will be appreciated that the scan set contains file system identifiers for the file, and the type of identifier used will depend on the underlying file system. Beginning with the first file (block 601), the session stamp for each file in the scan set is examined as described previously (block 603). If it does not exist (block 605), the file is scanned (block 607) and an appropriate session stamp created (block 609). If the session stamp is found but is invalidated (block 611) by the tests described previously, the file is rescanned at block 607 and the session stamp is updated at block 609. In one embodiment, the session stamp is updated by replacing it with a new session stamp. In an alternate embodiment, only context information within the existing session stamp is replaced as required as described further below in conjunction with the description of the context information.

When a valid session stamp indicates that the corresponding file is infected (block 613), the file is reported as infected (block 615) by displaying the information to the user, storing the information in a database, creating a hard copy report or other such reporting mechanisms well understood by one of skill in the art. The processing represented by block 619 also encompasses creating a session stamp that indicates the file is infected if appropriate.

After the current file is processed, the pre-determined scan set is reviewed (block 617) and the next file is found (block 619) if all files in the set have not yet been scanned.

Figure 7:
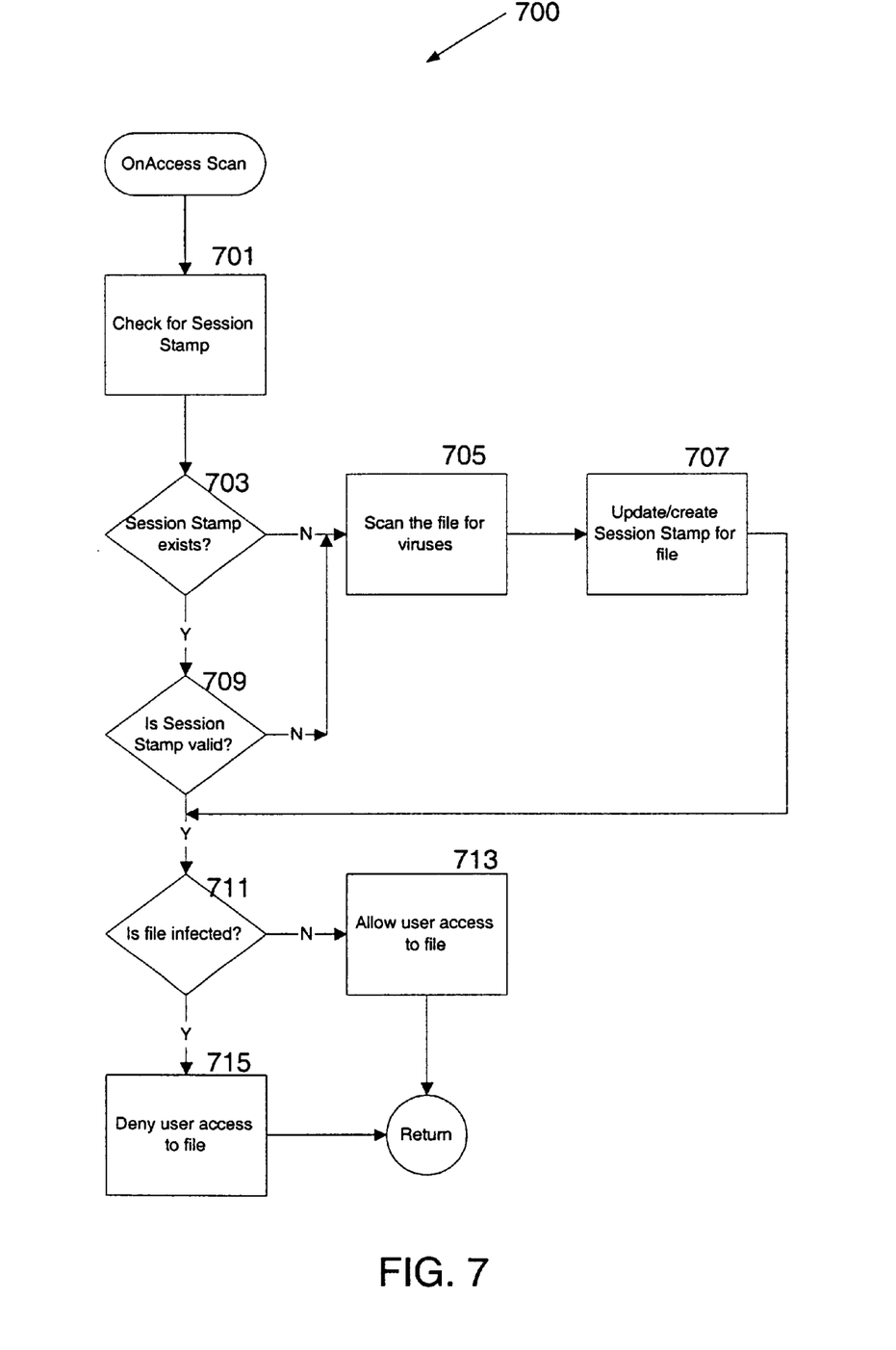
FIG. 7 is a flowchart of an on access scan method performed by a computer executing the method shown in FIG. 4.

The acts performed by the computer when a file is accessed are described next with reference to FIG. 7. It will be appreciated that the on-access scan method 700 will be similar to the on-demand scan method 600 if more than one file is accessed at a time. The on-access scan method 700 first checks for the presence of a session stamp in the directory entry for the file (block 701). If the session stamp is not found (block 703), the file is scanned for viruses (block 705) and an appropriate session stamp created (block 707). An invalid session stamp (block 709) causes the corresponding file to be rescanned and the session stamp updated at blocks 705 and 707, respectively.

If the session stamp is valid, it may indicate that the file is infected (block 71 1). The user is allowed accesses to the file if uninfected (block 713) and denied access if infected (block 7015).

The particular methods performed by a computer executing one embodiment of the invention have been described. An anti-virus method has been shown by reference to flowcharts in FIGS. 5–8, including all the acts from 401 until 435, from 501 until 505, from 601 until 619, from 701 until 715, and from 801 until 805.

Data Structures and APIs

In this section of the detailed description, data structures and application program interfaces (APIs) for a particular implementation of the anti-virus method illustrated in FIG. 4 are described.
Session Stamp The validity of a session stamp can be based on its signature alone as described above. Additional context information can optionally be stored as illustrated in FIG. 9 and used in determining the validity of a session stamp.

Figure 9:
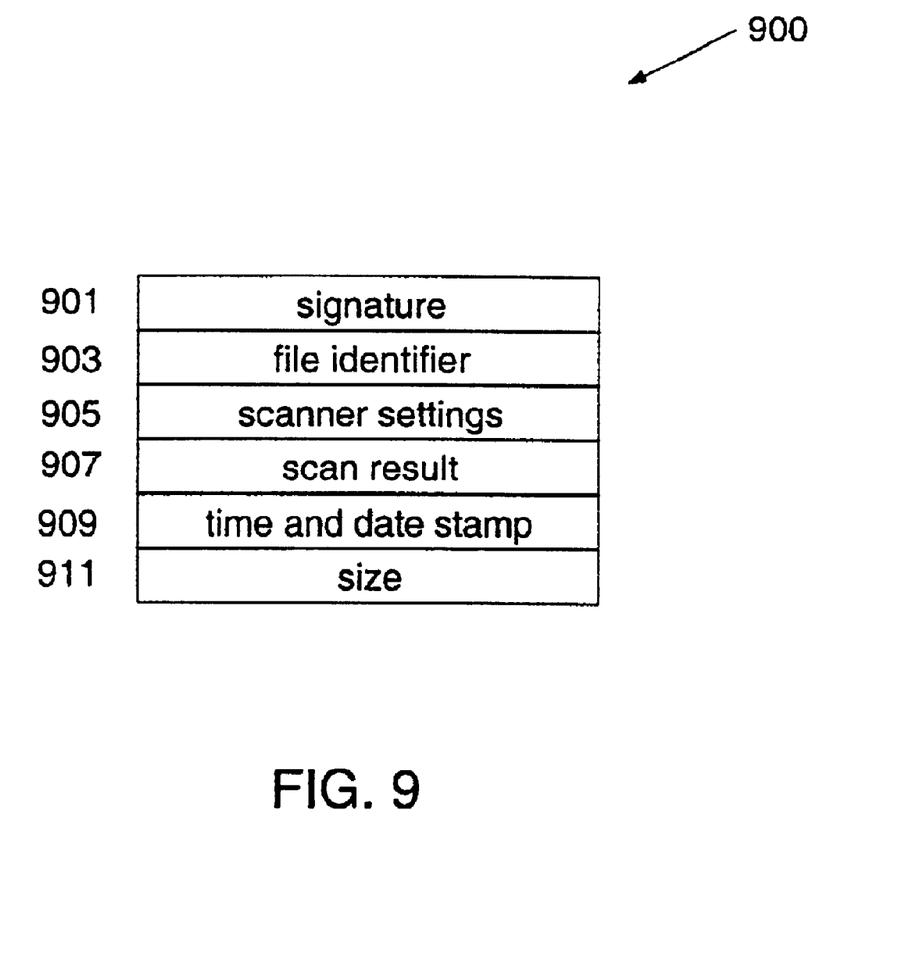
FIG. 9 is a diagram of a session stamp data structure for use in an implementation of the invention.

The embodiment of the session stamp of FIG. 9 includes a signature field 901, a file identifier field 903, one or more fields of scanner settings 905, a scan result field 907, a time and date stamp field 909, and a file size field 911. The fields can be present in various embodiment of the session stamp data structure 900.

A file identifier is created by the file system when the file is created. Because an application can copy extended attributes from one file to another, the file identifier is stored in the file identifier field 903 to guarantee that the session stamp data structure 900 refers to the correct file.

If the scanner uses variable sensitivity settings for things such as heuristics, then the relevant settings could be stored in the scanner settings field(s) 905. If the file is being accessed and the current settings are more restrictive than the setting for the previous scan, then the session stamp would be considered invalid and the file subject to scanning again. Additionally, the scanner settings field 905 can contain an identifier for the type of scan, e.g., on-demand or on-access, that was last performed on the file.

As described previously, storing information that the file is infected in scan result field 907 reduces the cost of anti-virus scanning by avoiding the unnecessary rescan of an infected file.

The values in the data and time stamp 909 and file size 911 fields offer a double check on whether the file has been modified.

Application Program Interfaces

The particular implementation being described in this section invoke the following API calls to perform the functions of the session stamping embodiments described previously. The API calls are issued by an anti-virus process, such as the on-demand scan method 600 or the on-access scan method 700 described above, to a session stamping process which executes the session stamping actions.

EnableSessionKey( )

void EnableSessionKey(void)

This routine is called to initialize session stamping. The session key is generated by this routine if necessary.

DisableSessionKey( )

void DisableSessionKey(void)

This routine disables session stamping.

HasFileGotValidSessionStamp( )

unsigned nt HasFileGotValidSessionStamp( char* szFile, unsigned int * puSigner, unsigned int uIam,

HVSCANENGINE hEngine

)

This routine determines the validity of the session stamp associated with a file identified by the szFile parameter. The uIam parameter identifies the particular process making the call, such as the on-demand scan method 600 or the on-access scan method 700 described previously. The hEngine parameter identifies the context information used to determine the validity of the session stamp as described immediately above. The identifier for the last process that called the StampFileWithSessionStamp API (described next) is returned to the present caller in the puSigner parameter, along with the validity of the session stamp.

DeleteSessionStamp( )

unsigned int DeleteSessionStamp ( char * szFile

)

This routine removes any session stamp associated with a file identified by the szFile parameter.

StampFileWithSessionStamp( )

unsigned int StampFileWithSessionStamp ( char * szFile, unsigned int uIam,

HVSCANENGINE hEngine

)

This routine associates a session stamp with a file identified by the szFile parameter. The uIam parameter contains the identifier for the process issuing the call and the hEngine parameter identifies the context information to be included in the session stamp as described immediately above.

In this section, the context information included in the session stamp for a particular implementation of the invention has been described. A basic set of APIs for a particular implement of the invention have been described in this section.

Conclusion

The anti-virus session stamping of the present invention decreases the number of times a file must be scanned and the elapsed time necessary to perform scanning overall, thus increasing the rapidity with which files can be accessed while still providing virus protection. Session stamping has been described with reference to a system, a series of methods, and a data structure and APIs for a particular implementation.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate that the invention can be practiced without the use of the pre-population scan. Furthermore, those of ordinary skill within the art will appreciate that the context information stored in the session stamp can vary depending on the underlying anti-virus scanning engine.

The terminology used in this application with respect to the operating environment is meant to include all environments that support extended attributes for file directory entries. Therefore, it is manifestly intended that this invention be limited only by the following claims and equivalents thereof.

What is claimed is:

1. A computerized method for scanning files for viruses comprising:

generating a current session key upon an execution of the method;

obtaining a session stamp associated with a directory entry for a file, wherein the session stamp is sorted in an extended attributes section of the directory entry for the file;

scanning the file if the session stamp was created using a previous session key; and    updating the session stamp as a result of the scan.

2. The method of claim 1, further comprising:

scanning the file if there is no session stamp associated with the directory entry for the file; and    creating a session stamp using the current session key as a result of the scan.

3. The method of claim 1, wherein updating the session stamp comprises invalidating the session stamp if the file is infected with a virus.

4. The method of claim 1, wherein the session stamp comprises an infection indicator and updating the session stamp comprises modifying the infection indicator when the file is infected with a virus.

5. The method of claim 1, wherein the session stamp comprises a signature and updating the session stamp comprises encrypting a known value with the current session key to create the signature.

6. The method of claim 1, wherein the session stamp comprises a signature and updating the session stamp comprises replacing a previous session key with the current session key.

7. The method of claim 1, wherein the session stamp comprises context information and updating the session stamp comprises replacing previous context information with current context information.

8. The method of claim 1, wherein obtaining the session stamp, scanning the file, and updating the session stamp are performed when the file is accessed.

9. The method of claim 1, wherein obtaining the session stamp, scanning the file, and updating the session stamp are performed upon the file as a result of a user command.

10. The method of claim 1, further comprising:
loading a pre-determined set of file identifiers, wherein obtaining the session stamp, scanning the file, and updating the session stamp are performed on each file identified by the file identifiers.

11. The method of claim 10, wherein the pre-determined set of file identifiers is most-recently-used cache of identifiers for the files that have been most recently used, and further comprising:
adding an identifier for the file to the most-recently-used cache when the file is accessed; and
storing the most-recently-used cache to non-volatile storage upon termination of the execution.

12. The method of claim 10, wherein the predetermined set of file identifiers is created from user input.

13. The method of claim 10, wherein obtaining the session stamp, scanning the file, and updating the session stamp are performed as a background task on each file identified by the file identifiers.

14. A computer-readable medium having stored thereon executable instructions to cause a computer to perform a method comprising:
generating a current session key upon an execution of the instructions;
obtaining a session stamp associated with a directory entry for a file, wherein the session stamp is stored in an extended attributes section of the directory entry for the file;
scanning the file if the session stamp was created using a previous session key; and
updating the session stamp as a result of the scan.

15. The computer-readable medium of claim 14, further comprising:
scanning the file if there is no session stamp associated with the directory entry for the file; and
creating a session stamp using the current session key as a result of the scan.

16. The computer-readable medium of claim 14, wherein obtaining the session stamp, scanning the file, and updating the session stamp are performed when the file is accessed.

17. The computer-readable medium of claim 14, wherein obtaining the session stamp, scanning the file, and updating the session stamp are performed when the file is accessed.

18. The computer-readable medium of claim 14, further comprising:
loading a pre-determined set of file identifiers, wherein obtaining the session stamp, scanning the file, and updating the session stamp are performed on each file identified by the file identifier.

19. A computer-readable medium having stored thereon a session stamp data structure comprising:
a file identifier field containing data representing an identifier for a file in a file system; and
a signature field containing data created by an execution of an anti-virus process that last scanned the file identified by the file identifier field.

20. The computer-readable medium of claim 19, wherein the data in the signature field represents a pre-determined value encrypted by a session key associated with the execution of the anti-virus process.

21. The computer-readable medium of claim 19, wherein the data in the signature field represents a session key associated with the execution of the anti-virus process.

22. The computer-readable medium of claim 19, further comprising:
a scanner settings field containing data representing a configuration for the antivirus process that last scanned the file identified by the file identifier field.

23. The computer-readable medium of claim 19, further comprising:
a scan result field containing data representing an infection status returned by the anti-virus process that last scanned the file identified by the file identifier field.

24. The computer readable medium of claim 19, further comprising:
a time and date stamp field containing data representing a time and date the file identified by the file identifier field was last modified.

25. The computer-readable medium of claim 19, further comprising:
a size field containing data representing a size for the file identified by the file identifier field.

26. A computer system comprising:
a processor coupled to a system bus;
a memory coupled to the processor through the system bus;
a computer-readable medium coupled to the processor through the system bus;
a virus scanning process executed from the computer-readable medium by the processor, wherein the scanning process causes the processor to generate a current session key when the scanning process is executed from the computer-readable medium, and further to obtain a session stamp associated with a directory entry for a file from the computer-readable medium, to scan the file if the session stamp was created using a previous session key, and to update the session stamp on the computer-readable medium as a result of the scan.

27. The computer system of claim 26, wherein the virus scanning process further causes the processor to scan the file if there is no session stamp associated with the directory entry for the file on the computer-readable medium, to create a session stamp using the current session key as a result of the scan, and to store the session stamp in the directory entry for the file on the computer-readable medium.

28. The computer system of claim 26, further comprising a user input device coupled to the processor through the system bus, wherein input from the user input device instructs the virus scanning process to scan the file.

29. The computer system of claim 26, further comprising an application process executed from the computer-readable medium by the process, wherein a request from the application process for the file causes the processor to scan the file.

30. A method for communicating between an anti-virus process and a session stamping process comprising:
issuing, by the anti-virus process, an enable-session-key call;
receiving, by the session stamping process, the enable-session-key call and, in response thereto, initializing a stamping session and generating a session key;
issuing, by the anti-virus process, a disable-session-key call; and receiving, by the session stamping process, the disable-session-key call and, in response thereto, disabling the stamping session.

31. The method of claim 30, further comprising:

issuing, by the anti-virus process, a stamp-file-with-session-stamp call having a file parameter; and receiving, by the session stamping process, the stamp-file-with-session-stamp call and, in response thereto, generating a session stamp using the session key and associating the session stamp with a file identified by the file parameter.

32. The method of claim 31, wherein the stamp-file-with-session-stamp call further has an engine parameter identifying context information used to generate the session stamp.

33. The method of claim 31, wherein the stamp-file-with-session-stamp call further has an iam parameter identifying the anti-virus process currently calling the session stamping process.

34. The method of claim 30, further comprising:

issuing, by the anti-virus process, a delete-session-stamp call having a file parameter; and receiving, by the session stamping process, the delete-session-stamp call and, in response thereto, deleting any session stamp associated with the file identified by the file parameter.

35. The method of claim 30, further comprising:

issuing, by the anti-virus process, a has-file-got-valid-session-stamp call having a file parameter;

receiving, by the session stamping process, the has-file-got-valid-session-stamp call and, in response thereto, determining a validity for any session stamp associated with the file identified by the file parameter; and returning, by the session stamping process, the validity to the anti-virus process.

36. The method of claim 35, wherein the has-file-got-valid-session-stamp call further has an engine parameter identifying context information used to determine the validity of the session stamp.

37. The method of claim 35, wherein the has-file-got-valid-session-stamp call further has an iam parameter identifying the anti-virus process currently calling the session stamping process.

38. The method of claim 35, wherein the has-file-got-valid-session-stamp call further has a signer parameter, and further comprising:

returning, by the session stamping process, an identifier for the anti-virus process that last called the session stamping process as the signer parameter.

* * * * *

UNITED STATES PATENT AND TRADEMARK OFFICE
CERTIFICATE OF CORRECTION

PATENT NO. : 6,735,700 B1
APPLICATION NO. : 09/481060
DATED : May 11, 2004
INVENTOR(S) : Flint et al.

Page 1 of 1

It is certified that error appears in the above-identified patent and that said Letters Patent is hereby corrected as shown below:

col. 12, line 39 replace "sorted" with --stored--;
    col. 13, line 15 insert --a-- before "most" and after "identifiers";
    col. 13, line 22 replace "predetermined" with --pre-determined--;
    col. 13, line 51 replace "when" with --upon--;
    col. 13, line 51 replace "is accessed" with --as a result of a user command--.

Signed and Sealed this

Second Day of February, 2010

David J. Kappos
*Director of the United States Patent and Trademark Office*